Nov. 1, 1960         S. D. ALEXANDROFF         2,958,563
                         BEARING
Filed May 19, 1958                        4 Sheets-Sheet 1
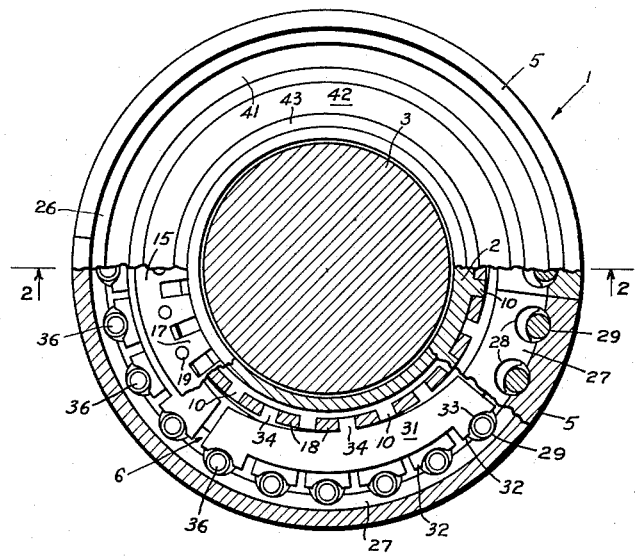
FIG. 1
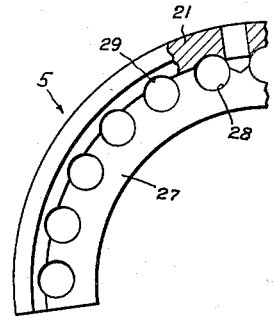
FIG. 7
FIG. 8
FIG. 9
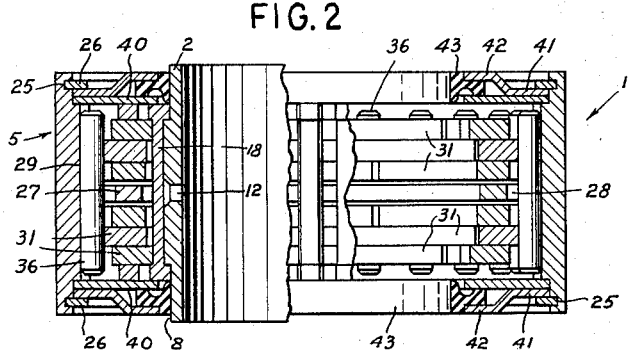
FIG. 2
FIG. 10
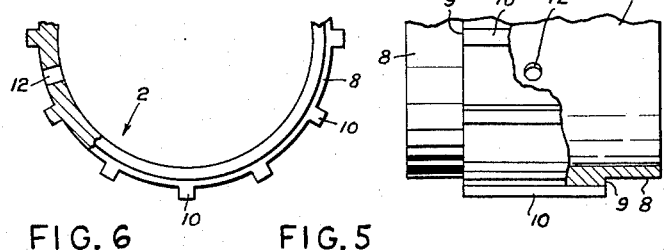
FIG. 3   FIG. 4
FIG. 6   FIG. 5
INVENTOR.
SERGEI D. ALEXANDROFF.
BY Alexander Riaboff
ATTORNEY Nov. 1, 1960 S. D. ALEXANDROFF 2,958,563
BEARING
Filed May 19, 1958 4 Sheets-Sheet 2
FIG.11
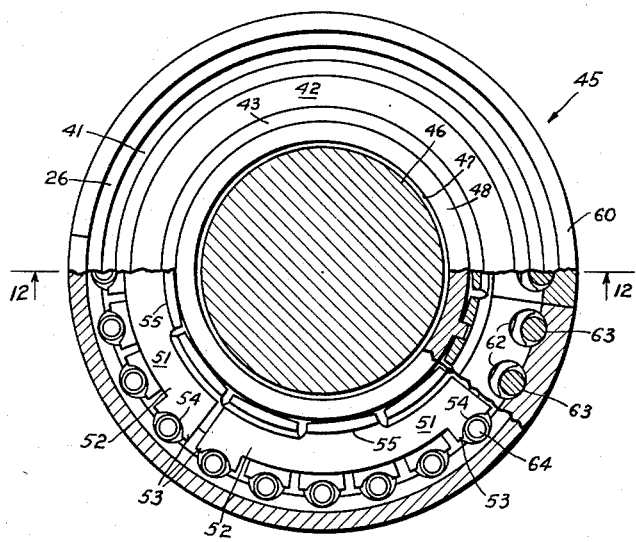
FIG.17
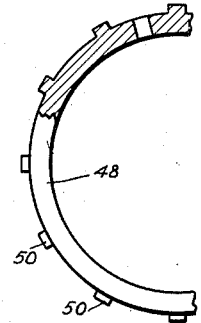
FIG.18
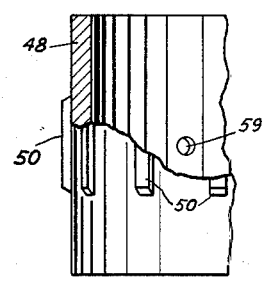
FIG.19
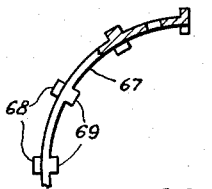
FIG.20
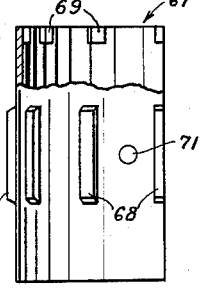
FIG.12
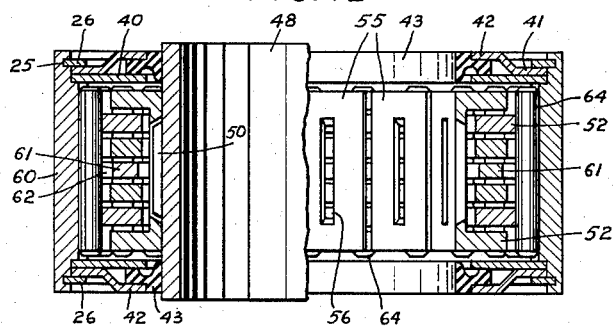
FIG.13
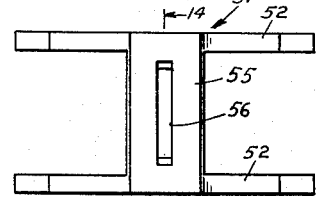
FIG.14 FIG.15 FIG.16
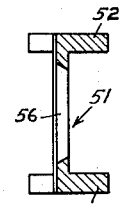 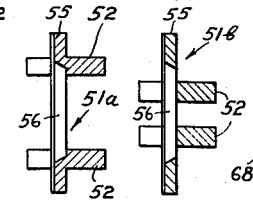
FIG.21 FIG.22
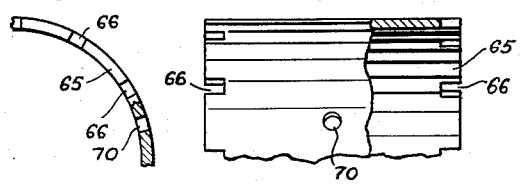
INVENTOR.
SERGEI D. ALEXANDROFF.
BY Alexander Riaboff
ATTORNEY Nov. 1, 1960 S. D. ALEXANDROFF 2,958,563
BEARING
Filed May 19, 1958 4 Sheets-Sheet 3
FIG. 23
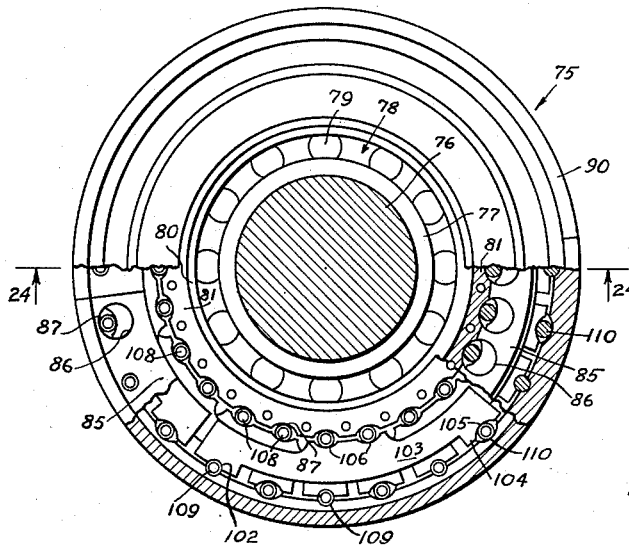
FIG. 25
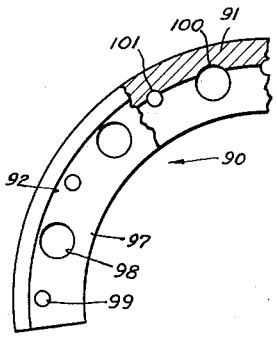
FIG. 26
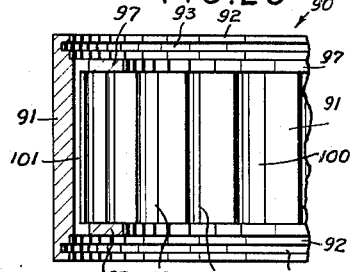
FIG. 24
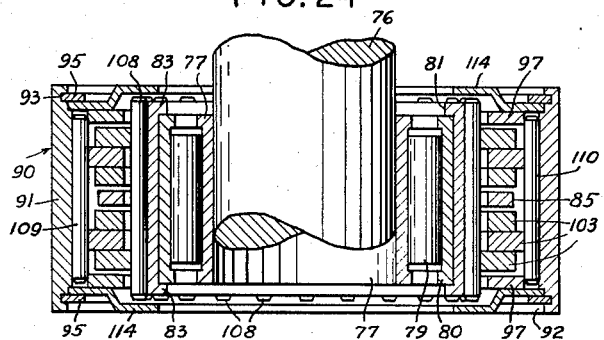
FIG. 27
FIG. 28
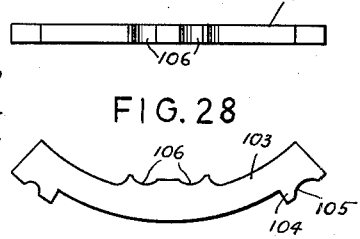
FIG. 29
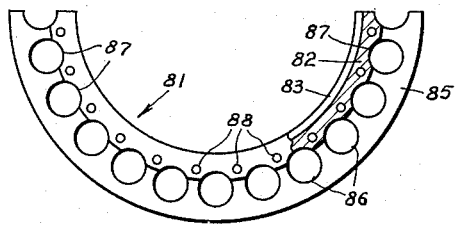
FIG. 30
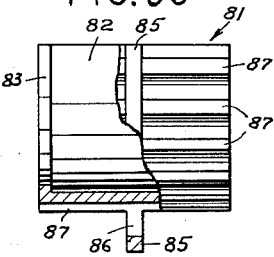
FIG. 31
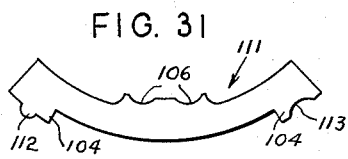
INVENTOR.
SERGEI D. ALEXANDROFF.
BY Alexander Ratoff
ATTORNEY Nov. 1, 1960   S. D. ALEXANDROFF   2,958,563
BEARING
Filed May 19, 1958   4 Sheets-Sheet 4
FIG. 32
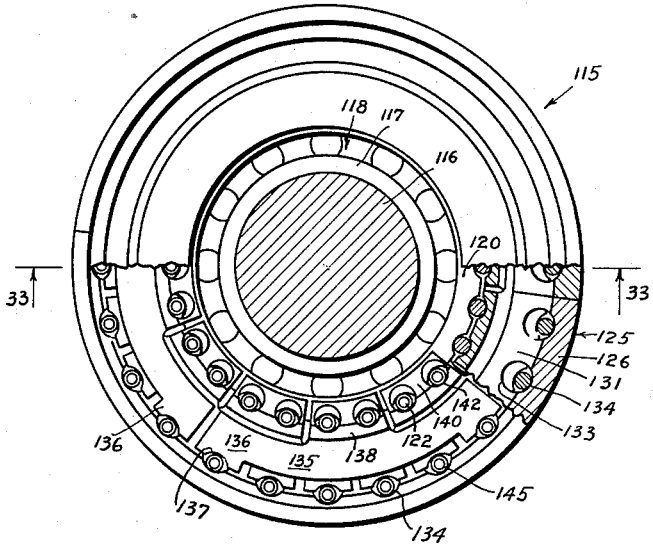
FIG. 33
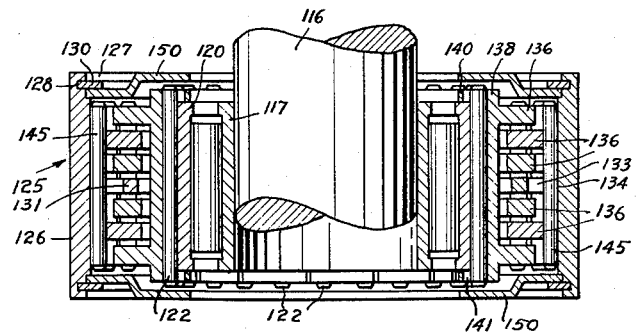
FIG. 34
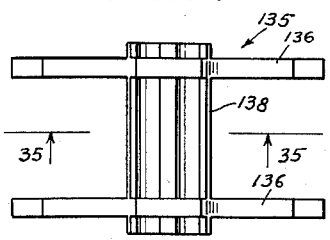
FIG. 35
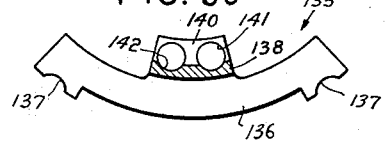
FIG. 36
FIG. 37
FIG. 38
FIG. 39
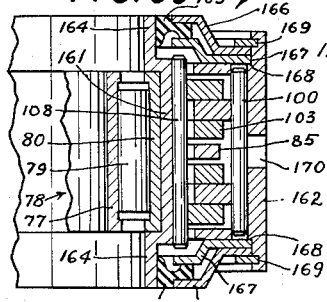
INVENTOR.
SERGEI D. ALEXANDROFF.
BY Alexander Riaboff
ATTORNEY United States Patent Office 2,958,563
Patented Nov. 1, 1960

2,958,563
BEARING

Sergei D. Alexandroff, Alameda, Calif.
(239 Clayton St., Apt. 1, San Francisco, Calif.)

Filed May 19, 1958, Ser. No. 736,059

31 Claims. (Cl. 308—26)

This invention relates to a bearing.

The object of this invention is to provide an elastic floating bearing consisting of an inner sleeve supporting a load bearing shaft, an outer sleeve by which the bearing is secured to a housing, and a plurality of springs therebetween for elastically distributing the load over an area of the inner sleeve equal to substantially one half of the bore thereof.

Another object of this invention is to provide a bearing of the type described in which the inner sleeve may resiliently be forced out of its central position.

Still another object of the invention is to provide a bearing of the type described in which the springs located between the inner and outer sleeves are compressed to exert a constant pressure upon the inner sleeve.

Still another object of this invention is to provide a bearing of the type described in which the springs are arranged around said inner sleeve circumferentially in staggered rows so as to abut said inner sleeve at many equidistantly spaced points thereon and, thus, to distribute the pressure equally on the surface of said sleeve.

Still another object of this invention is to provide means between said outer sleeve and said springs, for preventing circumferential rotation of the springs in relation to said outer sleeve, but allowing only minute displacement thereof.

Other objects and advantages will appear as the specification proceeds and the novel features of the device will be particularly pointed out in the claims hereto annexed.

In this specification and the annexed drawings, the invention is illustrated in the form considered to be the best, but it is understood, that the invention is not limited to such form; and it is also to be understood that in and by the claims following the description, it is desired to cover the invention in whatsoever form it may be embodied.

My invention is illustrated in the accompanying drawings in which:

Fig. 1 shows a plan view, partly in section, of the bearing comprising the subject matter of my invention.

Fig. 2 is a cross-sectional view of said bearing taken on the line 2—2 of Fig. 1, some parts being shown in elevation and the shaft being omitted.

Fig. 3 is a partial end view of the inner sleeve.

Fig. 4 is a partial side view of said sleeve, a part of which being shown in section.

Fig. 5 is an end view of the spring.

Fig. 6 is a plan view of the same.

Fig. 7 is a partial plan view of a half of the outer sleeve.

Fig. 8 is a vertical cross-section of the same.

Fig. 9 is a partial plan view of a half of the cage.

Fig. 10 is a side view of a half of the cage, partly shown in section.

Fig. 11 is a plan view of a first modified form of said bearing, partly shown in section.

Fig. 12 is a cross-sectional view of said modified form taken along the line 12—12 of Fig. 11, some parts being shown in elevation, and the shaft being omitted.

Fig. 13 is a back plan view of the spring used in said modified form.

Fig. 14 is a central cross-section taken along the line 14—14 of Fig. 13.

Fig. 15 is a central cross-section of another spring used in said modified form.

Fig. 16 is a central cross-section of still another spring used in said modified form.

Fig. 17 is a partial plan view of the inner sleeve, partially shown in section, used in said modified form.

Fig. 18 is a partial side view of said inner sleeve, partially shown in section.

Fig. 19 is a partial plan view of a half of the cage which may be used in said modified form.

Fig. 20 is a side view of the half of the last mentioned cage, partly shown in section.

Fig. 21 is a partial end view of the friction sleeve used in connection with the cage shown in Figs. 19 and 20.

Fig. 22 is a partial side view of said friction sleeve, partly shown in section.

Fig. 23 is a plan view of a second modified form of my bearing, shown partly in section.

Fig. 24 is a cross-sectional view of said second modified form of the bearing, some parts being shown in elevation.

Fig. 25 is a partial plan view of a half of the outer sleeve used in said second modified form.

Fig. 26 is a partial vertical cross-section of the same.

Fig. 27 is a side view of a spring used in said second modified form.

Fig. 28 is a plan view of the last mentioned spring.

Fig. 29 is a plan view of a half of the inner sleeve used in said second modified form.

Fig. 30 is a side view of a half of the last mentioned sleeve, partly in section.

Fig. 31 is a plan view of a modified form of the spring, shown in Fig. 28.

Fig. 32 is a plan view of a third modified form of said bearing, shown partly in section.

Fig. 33 is a cross-sectional view of said third modified form taken along the line 33—33 of Fig. 32, some parts being shown in elevation.

Fig. 34 is a back plan view of a spring used in said third modified form.

Fig. 35 is a cross-section along the line 35—35 of Fig. 34.

Fig. 36 is a partial end view of an outer race used in said third modified form.

Fig. 37 is a side view of said outer race, partly shown in section.

Fig. 38 is a modified form of the last mentioned outer race.

Fig. 39 is a partial vertical cross-section of a modified form of the bearing, shown in Figs. 23–24.

In detail, a bearing 1, shown in Figs. 1–10, consists of an inner sleeve 2, through which a load carrying shaft 3 passes and is arranged for rotation therein. The bearing 1 also includes an outer sleeve 5 which consists of two identical halves and which is securely locked in and attached to a housing, not shown in the drawings. Between said inner and outer rings a mechanism 6 is arranged, by which the load of the shaft 3 is distributed over a large area of the inner sleeve 2 and transmitted to a large area of the outer sleeve 5.

The inner sleeve 2 may be made out of soft metal and has ends 8 of reduced outside diameter so as to form a shoulder 9 thereon. A plurality of longitudinal equally spaced ribs 10 are provided between said shoulders 9 for the purpose hereinafter to be fully disclosed. A hole 12 is provided substantially in the middle of the sleeve 2 for lubricating the inner surface of said sleeve and the shaft 3.

The inner sleeve 2 is enclosed in a cage 15 consisting of two separate identical halves, each of which is formed with transverse end flanges 16 having a plurality of radial inwardly directed teeth 17. The corresponding teeth 17 of the lower and upper flanges 16 are connected by bars 18. The flanges 16 have certain radial flexibility which may be enhanced by the provision of a plurality of equally spaced holes 19 therein.

The cage 15 is placed on the inner sleeve 2 and completely encases the same. The distance between the flanges 16 is such that the latter abut the shoulders 9 of said sleeve. The bars 18 abut the outer surface of said sleeve, while each rib 10 rests between two adjoining bars 18. Thus, the cage 15 is locked against the longitudinal and circumferential displacements in relation to said inner sleeve 2.

The outer sleeve 5 comprises a comparatively heavy walled cylindrical body 21 split into two halves and formed with a recess 22 at each end forming a shoulder 23. An inner groove 25 is provided in each recess for retaining therein a retaining ring 26. Said outer sleeve is also formed with a heavy centrally located inner rib 27 projecting inwardly. A plurality of holes 28 are formed equidistantly in said rib with longitudinal grooves 29 in the body 21 opposite each hole.

The mechanism 6 consists of a plurality of heavy springs 31, which are shown in detail in Figs. 5 and 6. Each spring 31 is arcuated in shape and is made out of sheet steel. Each end of said spring is formed with an outwardly extending projection 32, in which a substantially half circular indentation 33 is provided. The spring 31 also has an abutment 34 in the middle of its inner side.

The springs 31 are arranged between said cage 15 and the outer sleeve 5 in staggered layers so that the abutments 34 rest between the bars 18 of said cage, and the inner sides of said springs abut said bars, as shown best in Fig. 1 and the indentations 33 of said springs are located radially opposite the grooves 29 of the outer sleeve 5. A roller 36 is driven into each pair of said indentation and groove. Said rollers are so designed that when they are driven as above said they exert considerable pressure, preferably equal to a half of the maximum load on the shaft 3, on said springs 31, cage 15 and the inner sleeve 2. Three staggered circular rows of the springs 31 are arranged between the upper flange 16 of the cage 15 and the inner rib 27 of the outer sleeve 5, while other three circular rows of said springs are arranged between said inner rib and the lower flange 16, thus preventing the lateral displacement of the same. It is desirable to keep the distance between said springs, flange and rib of about .002".

The mechanism 6 is closed on both sides by a ring shaped closure 40 which rests on the shoulder 23 of the outer sleeve 5 and the flange 16, and prevents the displacement of the rollers 36. A cover 41 having a raised central portion 42 is placed on the closure 40 so that said portion 42 in cooperation with said closure retains an oil retaining ring 43. The closure 40 and the cover 41 are locked in their position by the retaining ring 26.

The diameter of the shaft 3 is usually several thousandths of an inch smaller than the bore of the inner sleeve 2. Therefore, the area of contact between said shaft and the inner ring is limited to a comparatively small area lying radially in direction of the load on said shaft. If said shaft has a constant downwardly directed load, and if the inner sleeve is rigid, the constant friction imposed on a limited area of contact therebetween will wear out said area in spite of lubrication which is supplied to said area.

In the flexible bearing of the present design, when a downward load is applied on the shaft 3, the pressure of the inner sleeve 2 is transmitted to the springs 31 directly under the pressure area, whereby said springs are bent slightly and the inner sleeve 2 consequently bends outwardly slightly. The springs 31 located opposite said area, on the upper side of the inner sleeve, will partially be relieved of the constant pressure and the springs to the right and the left of said inner sleeve will be displaced downwardly slightly and their pressure on the inner sleeve will be increased due to the fact that the downward displacement of the indentations 33 of the springs 31 in relation to the grooves 29 of the sleeve 5 pushes the rollers 36 downwardly on the outwardly inclined halves of the grooves 29 and thereby forces said rollers inwardly, i.e., toward the center of the bearing, thus compressing the inner sleeve 2 a few thousandths of an inch. As the result of said forces, the constant pressure of said springs and an additional force as above described, the inner sleeve assumes slightly elliptical shape, and increases the area of contact with the shaft 3 up to one half of the area of the inner sleeve bore. Such increase results in better distribution of the load on said inner sleeve and in better lubrication, and consequently in less wear. In case the inner sleeve 2 should become hot, it may expand, and thus "freezing" of the shaft 3 thereon is avoided.

Figs. 11 to 18 show first modified form of a bearing 45, in which a shaft 46 passes through a bore 47 of an inner sleeve 48. The latter is cylindrical in shape and is provided on its outer surface with a plurality of longitudinal ribs 50 equally spaced from each other. The ribs 50 are located approximately in the middle third of the length of said sleeve, which is preferably made of hard metal.

A plurality of double springs 51 is arranged on said inner sleeve 48. The spring 51 consists of a pair of spring blades 52 of substantially the same form as the spring 31. Each of said blades is arcuate in shape and has at each end a projection 53 in which a substantially semi-circular indentation 54 is formed. The inner sides of said blades are connected by a bridge 55 having a rectangular opening 56 therein into which a rib 50 enters when said spring 51 is placed on said inner sleeve. Figs. 14, 15 and 16 show that there are three kinds of springs: 51, 51a and 51b respectively, having different distances between the blades 52 and being exactly the same in other details. The difference in the distances between the blades 52 permits to arrange said springs 51 in staggered relation to each other around said inner sleeve 48.

The outer sleeve 60 is constructed exactly the same way as the outer sleeve 5. It consists of two halves and has a central inwardly directed rib 61 perforated by a plurality of equidistantly spaced holes 62, forming grooves 63 in the sleeve 60.

The springs 51, 51a and 51b are placed on the inner sleeve 48 so that the ribs 50 of said sleeve enter the rectangular openings 56 in the bridges 55 and the blades of one spring enter a space between the blades of the adjoining spring. The outer sleeve 60 is placed over said springs so that the indentations 54 are opposite the grooves 63 in said outer sleeve. A roller 64 is driven into each pair of said indentations and grooves to hold said springs under constant pressure which is substantially equal to one half of the maximum load of the shaft. The operation of the bearing 45 is exactly the same as of the bearing 1. A hole 59 is provided in the inner sleeve 48 for lubricating the same and the shaft 46. The top and the bottom of said bearing 45 are closed in exactly the same manner as in the bearing 1.

Figs. 19–22 show a modification of the bearing 45, in which the inner sleeve is shown as consisting of a cylindrical friction sleeve 65, shown in Figs. 21–22, having equally spaced dents 66 in each end thereof, and of a cage 67 consisting of two identical cylindrical halves. The cage 67 is formed with a plurality of equidistantly spaced ribs 68 which are of the same form and function as the ribs 50 of the inner sleeve 48, and a plurality of equally spaced embossments 69 which fit into the dents 66 when the cage 67 is placed on the sleeve 65, thus preventing the displacement of one in relation to the other. A hole 70 in the sleeve 65 and a hole 71 in the cage 67 are provided for lubricating said sleeve and the shaft rotating therein. The latter form is used when it is desired to make the inner surface of the inner sleeve out of soft metal.

Figs. 23-30 show second modified form as a bearing 75 in which a shaft 76 passes through an inner race 77 of a roller bearing 78 having rollers 79 and an outer race 80.

A cage 81, consisting of two identical halves, encloses the outer race 80. The cage 81 consists of a cylindrical body 82 having an upper and a lower lip 83 inwardly directed for preventing the longitudinal displacement of the same in relation to the outer race. A centrally located outer rib 85 is provided or the outer surface of said cage which rib is perforated by a plurality of equidistantly spaced holes 86 forming rounded grooves 87 in the body 82 opposite said holes. Holes 88 may be drilled in said body 82 to increase and equalize its resiliency.

The bearing 75 also includes an outer sleeve 90, consisting of two identical halves, which is substantially the same as the outer sleeve 5, and has a cylindrical body 91 with an inner recess 92 on each end thereof. An inner groove 93 is provided in each recess 92 for retaining therein a retaining ring 95. The outer sleeve is also provided with two inner ribs 97 each located at said recess. The ribs 97 are perforated with a plurality of equally spaced large holes 98 and the body 91 is formed with wide longitudinal grooves 100 located opposite said holes. A plurality of small holes 99 is also provided in said ribs, each of the latter hole being located between and equally distant from two adjoining large holes. Each of said small holes 98 is formed with a narrow longitudinal groove 101 in said body.

A plurality of springs 103 is arranged between the outer sleeve 90 and the cage 81. The springs 103 are substantially the same as the springs 31 and are formed with end projections 104, one of which has a small round indentation 102 and the other a large round indentation 105. The inner side of said spring 103 is provided with a pair of centrally located indentations 106. The latter indentations abut rollers 108 placed in the grooves 87 and through the holes 86 of the cage 81. The indentations 105 are located opposite the wide grooves 100 and the indentations 102 opposite the narrow grooves 101, when the bearing 75 is assembled. Rollers 110 are driven in respective indentations 105 and wide grooves 100, and pins 109 in indentations 102 and respective narrow grooves 101 to hold said spring under the pressure as it has been described heretofore.

The springs 103 are packed in staggered rows circumferentially about the cage 81, three rows of the springs between the upper inner rib 97 of the outer sleeve 90 and the rib 85 of the cage 81, and three rows of said springs between said rib 85 and the lower inner rib 97, said ribs preventing the displacement of said springs.

One end of the spring 103 is securely anchored to the outer sleeve 90 by the pin 109 passing through a narrow groove 101 and a small indentation 102 while the other end of the spring rests on the roller 110 by its large indentation 105, and has a freedom of limited movement. Therefore, the spring 103, while being securely anchored to the outer sleeve to prevent its displacement in relation to the latter, may expand or contract.

The outer sleeve 90 is encased and anchored in a usual housing not shown in the drawings.

Fig. 31 shows a modified form of a spring 111, which is substantially identical with the spring 103 and in which a round embossment 112 is provided at one end thereof, instead of an indentation as shown at 113 in the other end. When a roller is driven into said indentation 113 and a corresponding groove 100 in the outer sleeve 90, the embossment 112 acts as a pin, or a fulcrum, for pressing the spring 111 against the cage 81.

Both ends of the bearing 75 are closed by closures 114 locked in place by the retaining rings 95, which closures keep the rollers 108 and 110 in their respective grooves.

When a considerable load is applied on the shaft 76 downwardly (for example), the shaft 76 presses on the lowermost portion of the inner race 77 which in turn transfers said load to the roller 79 and therethrough to the outer race 80. In an ordinary roller, or ball bearing the load is transferred from the inner race to the outer race by one roller or ball. In the present bearing the load will move the outer race 80 and the cage 81 downwardly, compressing the springs 103 thereunder and partially relieving the constant pressure of the upper springs, and at the same time displacing the cage 81 downwardly slightly in relation to the springs 103. The outwardly curved surface of the grooves 87 will press the rollers 108 outwardly and thereby will increase the pressure on the sides of the outer race and bend the same inwardly a few ten thousandths of an inch, thus forcing other rollers 79 to contact the inner and outer races, whereby a better distribution of the load is obtained.

Figs. 32-37 show third modified form in a bearing 115, in which a shaft 116 passes through an inner race 117 of a roller bearing 118 having an outer race 120. The latter is provided on the outer surface thereof with a plurality of equally spaced rounded longitudinal grooves 121 into which rollers 122 are placed.

The bearing 115 also includes an outer sleeve 125 consisting of two identical halves, which is of substantially the same shape and form as the sleeve 90 in the previously described bearing 75, and which consists of a cylindrical body 126 with an inner recess 127 at each end thereof, in which recess an inner circular groove 128 is provided for a retaining ring 130. The outer sleeve is also provided with a central inwardly directed rib 131 perforated with a plurality of equally spaced holes 133 and with a plurality of longitudinal grooves 134 located on the inner side of said sleeve opposite said holes.

Double springs 135 are used in the bearing 115, which springs are substantially the same as the springs 51. Each of them consists of a pair of spring blades 136 having indentations 137 formed at each end thereof and connected by a bridge 138. The distance between said blades 136 varies, as shown in Figs. 14, 15 and 16, so as to permit staggering of said springs when the same are assembled on the outer race 120. A transverse flange 140 is arranged on each end of said bridge 138, which flange is directed inwardly and is perforated by two holes 141. The bridge is formed with a pair of longitudinal grooves 142 on its inner side opposite said holes 141. The outer race 120 fits between said flanges 140 and is so placed that the grooves 142 meet the grooves 121 when the springs 135 are arranged on said outer race. The rollers 122 are placed into each pair of said grooves, which rollers extend the length of the bridge 138 and pass through the holes 141 in the flanges 140. When the springs 135 are arranged on said outer race, and the outer sleeve 125 is properly located on said bearing, the grooves 134 of said sleeve are set against the indentations 137 of the springs 135, and a roller 145 is forced between each pair of said grooves and indentations so that the springs are put under a considerable pressure.

Both ends of the bearing 115 are closed by a closure 150 which is locked in place by the retaining ring 130. The closure 150 keeps the rollers 122 and 145 in place and prevents their longitudinal displacement.

The operation of this bearing is the same as of the bearing 75, except that a slight displacement of the springs 135 in relation to the outer sleeve 125 is made possible by provision of the comparatively large indentations 137 in said springs and comparatively wide grooves 134 in said sleeve.

Fig. 38 shows a modified form of the outer race 151 which is the same as the outer race 120, but has a plurality of longitudinal holes 152 to increase and equalize its resiliency.

Fig. 39 shows a fourth modified form in a bearing 160 which is exactly the same in design and operation as the bearing 75, shown in Figs. 23–30, with the following exceptions: the space between the cage 161 and the outer sleeve 162 is closed on both sides for providing oil circulation in said space to cool the cage 161 and the adjoining outer race 80, which may be overheated under extreme load conditions. The space between said cage and outer sleeve may be closed different ways and is shown in said figure as being closed by an oil ring 163 abutting a shoulder 164 extending axially from the cage 161, said oil ring being tightly held against said shoulder by an outer closure 166 and an inner closure 167. Said closures rest on a shoulder 168 formed in the sleeve 162 and locked by a retaining ring 169, substantially the same as shown in Figs. 2 and 12.

The outersleeve 162 consists of two identical halves, each having a hole 170 therein by means of which oil enters the closed space between the cage 161 and the outer sleeve 162, passes through the same and leaves through the other hole 170 without entering the roller bearing 78. Oil passing through the space cools the cage and the adjoining outer race 80.

Each of the above described bearings may be of a split type without departing from the spirit of the present invention.

I claim:

1. A bearing comprising an inner sleeve for rotatably supporting a shaft, an outer sleeve enclosing the inner sleeve, a mechanism between said inner sleeve and outer sleeve for flexibly transmitting the load from said inner sleeve to the outer sleeve and including a plurality of staggered springs arranged under pressure between said sleeves, each spring being in form of a radially curved flat piece having means at the center of its inner side to abut said inner sleeve, and means associated with the ends of said springs for transmitting the load from said springs to said outer sleeve.

2. A bearing comprising an inner sleeve for supporting a shaft, an outer sleeve enclosing said inner sleeve, a plurality of springs arranged in close proximity to each other in axial direction and circumferentially around said inner sleeve in rows staggered in axial direction, each spring being connected with the inner and outer sleeves, said springs being under pressure, means for anchoring said springs to said inner sleeve, means for anchoring said springs to the outer sleeve with freedom of slight displacement of said springs in relation to said outer sleeve, whereby the pressure of the displaced springs is increased in proportion to such displacement.

3. In a bearing, an inner sleeve and an outer sleeve enclosing said inner sleeve and being radially spaced therefrom, means for holding the inner sleeve under pressure comprising a plurality of springs in form of radially curved flat pieces spaced closely in axial direction and arranged in rows staggered in axial direction around said inner sleeve each being connected with the inner and outer sleeves, means on said springs and means on said inner sleeve for preventing the circumferential displacement of said springs in relation to said inner sleeve and for transferring the load from said inner sleeve to said springs, means for transferring said load from said springs to said outer sleeve and for preventing rotation of the springs in relation to the outer sleeve, said last mentioned means keeping said springs under pressure, and means for preventing lateral displacement of said springs.

4. In a bearing, an inner sleeve and an outer sleeve enclosing the inner sleeve and being radially spaced therefrom, means for holding said inner sleeve under pressure comprising a plurality of springs in form of radially curved pieces arranged in staggered rows around said inner sleeve, an abutment in the center of the inner side of each spring, means on said inner sleeve for engaging said abutments for preventing the circumferential displacement of said springs in relation to said inner sleeve and for transferring the load from said inner sleeve to said spring, said springs having indentations at their ends on the sides thereof facing the outer sleeve, said outer sleeve having on its inner wall longitudinal grooves facing said indentations, means between each indentation and its respective groove for keeping said springs under pressure and for permitting only a slight circumferential displacement of said springs in relation to said outer sleeve whereby the pressure of the springs is increased in proportion to such displacement.

5. A bearing comprising an inner sleeve for supporting a shaft, a cage having longitudinal ribs on its outer surface enclosing said inner sleeve, means on said inner sleeve and said cage for preventing the rotation of said cage on said sleeve, a plurality of springs arranged on said cage, each spring having means thereon for anchoring the same to said cage and for preventing circumferential displacement of said springs in relation to said cage, an outer sleeve enclosing said cage and springs, said outer sleeve having a plurality of longitudinal grooves on its inner surface, means resting in said grooves and contacting the ends of said springs for keeping the same under pressure and for preventing rotation thereof in relation to said outer sleeve.

6. A bearing comprising an inner sleeve for supporting a shaft, a cage having longitudinal ribs on its outer surface, and enclosing said inner sleeve, means on said inner sleeve and said cage for preventing the rotation of said cage on said sleeve, a plurality of flat springs arranged on said cage, each spring having an abutment on its inner side for engaging said ribs on the cage for preventing the circumferential displacement of said springs in relation to said cage, an outer sleeve enclosing said springs, means between said springs and the inner surface of said outer sleeve for holding said springs under pressure and for preventing rotation of said inner sleeve, cage and springs in relation to said outer sleeve.

7. A bearing comprising an inner race for carrying a shaft therein, an outer race, a plurality of antifriction bearing elements therebetween, a cage enclosing said outer race, a plurality of springs arranged around said cage, each spring comprising a pair of spring blades connected by a bridge, means on said bridge and means on said cage for anchoring said springs to the cage, an outer sleeve enclosing said springs, and means between said spring blades and the inner surface of the outer sleeve for keeping said springs under pressure and for preventing their rotation in relation to said outer sleeve.

8. A bearing comprising an inner sleeve for supporting a shaft, an outer sleeve enclosing said inner sleeve, a plurality of springs arranged circumferentially around said inner sleeve, each of said springs comprising a plurality of spring blades connected by a bridge, means on said inner sleeve and on said bridge for preventing the displacement of said springs in relation to said inner sleeve, means between said spring blades and said outer sleeve for preventing rotation of said springs in relation to said outer sleeve and keeping said springs under pressure.

9. A bearing comprising means for rotatably supporting a shaft therein, an outer sleeve enclosing said means, a plurality of springs spaced closely in axial direction arranged circumferentially about said means in rows staggered in axial direction and between said means and said outer sleeve, means for anchoring said springs to the first mentioned means, means located between said springs and said outer sleeve for keeping said springs under pressure and for preventing rotation of said springs in relation to said outer sleeve except small displacement of said springs in relation to said sleeves, whereby the pressure of some of the springs is increased on said first mentioned means.

10. A bearing comprising means for retaining a shaft therein, an outer sleeve enclosing said means, a plurality of springs spaced closely in axial direction and arranged circumferentially about said means in rows staggered in axial direction between said means and said outer sleeve, each of said springs having means for abutment against said first mentioned means, means for preventing circumferential displacement of said springs in relation to said first mentioned means, means between said springs and said outer sleeve for keeping said springs under pressure, and means for preventing rotation of said springs in relation to said outer sleeve.

11. A bearing comprising means for retaining a shaft therein, an outer sleeve enclosing said means, a plurality of springs arranged circumferentially about said means in staggered rows between said means and said outer sleeve, each of said springs having means for abutment against said first mentioned means, said outer sleeve having a plurality of longitudinal grooves on the inner surface thereof, a plurality of rollers, each roller being disposed in one of said grooves and abutting an end of one of said springs for keeping the latter under tension and for preventing rotation of said springs in relation to said sleeve.

12. A bearing comprising an inner race for carrying a shaft therein, an outer race arranged around said inner race, a plurality of antifriction bearing elements therebetween, said outer race having a plurality of grooves on the outer surface thereof, a plurality of springs arranged around said outer race, each spring having an indentation on the side thereof facing the outer ring and an indentation at each end thereof on the opposite side, an outer sleeve enclosing said springs, said outer sleeve having a plurality of longitudinal grooves on its inner surface facing the second mentioned spring indentations, a plurality of rollers inserted between the outer race and the springs into the outer race grooves and indentations on the back side of the springs, a plurality of rollers inserted between the springs and the outer sleeve into the outer sleeve grooves and the spring indentations facing the same, and means for preventing lateral displacement of said springs in relation to said outer race and outer sleeve.

13. A bearing comprising an inner race for carrying a shaft therein, an outer race, a plurality of antifriction bearing elements therebetween, an outer sleeve enclosing said outer race, a mechanism between said outer race and said outer sleeve for flexibly transmitting the load from said outer race to the outer sleeve and including a plurality of springs arranged in rows, staggered in axial direction, said springs being under pressure, each spring being in form of a radially curved flat piece and having means at its center on its inner side for abutting said outer race, and means associated with the ends of said springs for transmitting the load from said springs to said outer sleeve and for elimination of slide friction between said springs and said outer sleeve.

14. A bearing comprising an inner race for carrying a shaft therein, an outer race, a plurality of antifriction bearing elements therebetween, an outer sleeve enclosing said outer race, a plurality of staggered in axial direction springs arranged circumferentially around said outer race, means on said springs and on said outer race for anchoring said springs to said outer race, means between said springs and said outer sleeve for preventing rotation of said springs in relation to said outer sleeve, and for elimination of slide friction between the springs and the outer sleeve, and keeping said springs under constant pressure.

15. A bearing as described in claim 13 wherein said springs have indentations on the ends thereof and said outer sleeve has a plurality of grooves on the inner side thereof opposite said indentations, and a plurality of rollers driven into said grooves and indentations for keeping said springs under constant pressure and for elimination of slide friction between the springs and the outer sleeve.

16. A bearing comprising an inner sleeve for carrying a shaft therein, an outer sleeve encompassing the inner sleeve, a mechanism between said sleeves for flexibly transmitting the load from said inner sleeve to the outer sleeve and including a plurality of springs arranged in rows staggered in axial direction, said springs being under pressure, each spring being in form of a radially curved flat piece and having means at its center on its inner side for abutting said inner sleeve, means on said inner sleeve for anchoring said springs, and means between said springs and said outer sleeve for preventing rotation of said springs in relation to said outer sleeve and for elimination of slide friction between the springs and the outer sleeve, and for keeping said springs under constant pressure.

17. A bearing as described in claim 16, wherein the last mentioned means permit small displacement of said springs in relation to the outer sleeve, whereby the pressure of displaced springs on the inner sleeve is increased in proportion to such displacement.

18. In a bearing of the character described and including an inner and outer sleeve, a spring comprising a pair of arcuate blades, a bridge connecting said blades, means on said bridge for connecting said spring to the inner sleeve, each of said blades having rounded depressions for admitting thereinto means associated with the outer sleeve for preventing rotation of the spring in relation to said outer sleeve.

19. A bearing comprising an inner race for carrying a shaft therein, an outer race, a plurality of antifriction bearing elements therebetween, an outer sleeve enclosing said outer race, a mechanism between said outer race and said outer sleeve for flexibly transmitting the load from said outer race to the outer sleeve and including a plurality of springs arranged in rows staggered in axial direction, said springs being under pressure, each spring being in form of a radially curved flat piece, and having indentations at its center on its inner side, means on said outer race for anchoring said springs thereto in cooperation with said indentations; means on one end of said springs for anchoring said end to said outer sleeve and means on the other end of said spring for elimination of sliding friction between said spring and said outer sleeve by permitting said second end to move slightly in relation to said outer sleeve.

20. A bearing as described in claim 19 in which pins are interposed between the ends of the springs and the outer sleeve for anchoring said ends to the outer sleeve, and rollers are inserted in the other ends of said springs permitting slight motion of said ends in relation to said outer sleeve.

21. A bearing as described in claim 13, in which rollers are interposed between the outer race and the springs with the freedom of slight displacement of said springs in relation to said outer race, and rollers are interposed between the ends of said springs and said outer sleeve permitting slight displacement of said springs in relation to said outer sleeve, wherein said rollers eliminate sliding friction between the respective parts they contact.

22. A bearing comprising an inner race for carrying a shaft therein, an outer race, a plurality of antifriction bearing elements therebetween, an outer sleeve enclosing said outer race, a mechanism between said outer race and said outer sleeve for flexibly transmitting the load from said outer race to the outer sleeve and including a plurality of springs arranged in rows, staggered in axial direction, each spring being in form of a radially curved flat piece, said outer race having a plurality of grooves, a roller in each of said grooves, means on said springs for abutting the last mentioned rollers with freedom of slight displacement of said springs in relation to the outer race; indentations on both ends of said springs on the side thereof facing the outer sleeve, a plurality of corresponding grooves on the inner side of the outer sleeve opposite said indentations, a plurality of rollers driven into said indentations and grooves to keep the springs under pressure, said last mentioned rollers permitting a slight displacement of said springs in relation to said outer sleeve.

23. A bearing comprising means for rotatably supporting a shaft, an outer sleeve enclosing said means, a mechanism between said means and said sleeve for flexibly transmitting the load from said means to the outer sleeve and including a plurality of springs arranged in rows staggered in axial direction, said springs being under pressure, each spring being in form of a radially curved flat piece, and having indentations at its center on its inner side, means on said first mentioned means for anchoring said springs thereto in cooperation with said indentations; means on one end of said springs for anchoring said end to said outer sleeve and means on the other end of said spring for elimination of sliding friction between said spring and said outer sleeve by permitting said second end to move slightly in relation to said outer sleeve.

24. A bearing as described in claim 23 wherein pins are interposed between the ends of the springs and the outer sleeve for anchoring said ends to the outer sleeve, and rollers are inserted in the other ends of said springs permitting slight motion of said ends in relation to said outer sleeve.

25. A bearing as described in claim 23 wherein rollers are interposed between the first mentioned means and the springs with freedom of slight displacement of said springs in relation to said first mentioned means; and rollers are interposed between the ends of said springs and the outer sleeves permitting slight displacement of said springs in relation to said outer sleeve, wherein said rollers eliminate sliding friction between the respective parts they contact.

26. A bearing comprising an inner sleeve for rotatably supporting a shaft, an outer sleeve enclosing said inner sleeve, a mechanism between said means and said outer sleeve for flexibly transmitting the load from said inner sleeve to the outer sleeve and including a plurality of springs arranged in rows, staggered in axial direction, each spring being in form of a radially curved flat piece, said inner sleeve having a plurality of grooves, a roller in each of said groves, means on said springs for abutting the last mentioned rollers with freedom of slight displacement of said springs in relation to the inner sleeve; indentations on both ends of said springs on the side thereof facing the outer sleeve, a plurality of corresponding grooves on the inner side of the outer sleeve opposite said indentations, a plurality of rollers driven into said indentations and grooves to keep the springs under pressure, said last mentioned rollers permitting a slight displacement of said springs in relation to said outer sleeve.

27. A device described in claim 13 in which the outer sleeve is formed with a pair of inwardly directed ribs for preventing axial displacement and disalignment of the springs.

28. A bearing comprising an inner race for carrying a shaft therein, an outer race, a plurality of antifriction bearing elements therebetween, a cage enclosing said outer race, means for preventing axial displacement of said cage in relation to said outer race, an outer sleeve enclosing said cage, a plurality of staggered in axial direction springs arranged circumferentially around said cage, means on said springs and on said outer race for anchoring said springs to said outer race, said cage having means for preventing rotation of said springs in relation to said outer sleeve, means for elimination of slide friction between the springs and the outer sleeve, and keeping said springs under constant pressure, and means on said cage and on said outer sleeve for preventing axial displacement and disalignment of said springs.

29. A device as described in claim 28 in which the last mentioned means consists of a central outwardly projecting rib on said cage and a pair of inner ribs formed on the outer sleeves, said last mentioned ribs enclosing said springs.

30. A bearing comprising an inner sleeve for rotatably supporting a shaft, a cage secured on the outer surface of said sleeve; an outer sleeve enclosing said inner sleeve and cage, a mechanism between said cage and outer sleeve for flexibly transmitting the load from said inner cage to said outer sleeve and including a plurality of staggered springs arranged under pressure between said cage and outer sleeve, each spring being in form of a radially curved flat piece having means at the center of its inner side for abutting said cage, means associated with the ends of said springs for transmitting the load from said springs to said outer sleeve, said outer sleeve having a central inwardly directed rib, and said cage having flanges on its ends for preventing axial displacement and disalignment of said springs.

31. A device as described in claim 1, in which means are provided for preventing axial displacement and disalignment of said springs.

References Cited in the file of this patent
UNITED STATES PATENTS

| | | |
|---|---|---|
| 900,860 | Ketchum | Oct. 13, 1908 |
| 1,370,599 | Leon | Mar. 8, 1921 |
| 1,946,993 | Trumpler | Feb. 13, 1934 |
| 2,012,997 | Junkers | Sept. 3, 1935 |
| 2,403,489 | Birmann | July 9, 1946 |
| 2,602,009 | Barlow et al. | July 1, 1952 |
| 2,614,896 | Pierce | Oct. 21, 1952 |

FOREIGN PATENTS

| | | |
|---|---|---|
| 1,022,182 | France | Dec. 10, 1952 |